US012785542B2

(12) United States Patent
Shi et al.

(10) Patent No.: US 12,785,542 B2
(45) Date of Patent: Nov. 3, 2026

(54) BOOTSTRAP DRIVE CIRCUIT, MOTOR CONTROLLER, COMPRESSOR, AND VEHICLE

(71) Applicants: ANHUI WELLING AUTO PARTS CORPORATION LIMITED, Hefei (CN); GUANGDONG WELLING AUTO PARTS CORPORATION LIMITED, Foshan (CN)

(72) Inventors: Hongkang Shi, Hefei (CN); Wanjie Song, Hefei (CN); Feixiang Qin, Hefei (CN)

(73) Assignees: ANHUI WELLING AUTO PARTS CORPORATION LIMITED, Hefei (CN); GUANGDONG WELLING AUTO PARTS CORPORATION LIMITED, Foshan (CN)

( * ) Notice: Subject to any disclaimer, the term of this patent is extended or adjusted under 35 U.S.C. 154(b) by 225 days.

(21) Appl. No.: 18/790,333

(22) Filed: Jul. 31, 2024

(65) Prior Publication Data

US 2024/0388191 A1 Nov. 21, 2024

Related U.S. Application Data

(63) Continuation of application No. PCT/CN2023/080812, filed on Mar. 10, 2023.

(30) Foreign Application Priority Data

Apr. 12, 2022 (CN) ........................ 202210378498.X

(51) Int. Cl.

| | |
|---|---|
| ***H02M 1/08*** | (2006.01) |
| ***B60R 16/03*** | (2006.01) |
| ***H02M 3/158*** | (2006.01) |

(52) U.S. Cl.

CPC ............. *H02M 1/08* (2013.01); *H02M 3/158* (2013.01); *B60R 16/03* (2013.01)

(58) Field of Classification Search

CPC ...... H02M 1/08; H02M 3/158; H02M 1/0006; H02M 1/32; H02M 7/53871; B60R 16/03;

(Continued)

(56) References Cited

U.S. PATENT DOCUMENTS 6,163,127 A * 12/2000 Patel ..................... B60L 15/025 318/705

9,806,644 B2 * 10/2017 Shimada .................. H02P 3/22

(Continued)

FOREIGN PATENT DOCUMENTS

CN 203537223 U 4/2014

CN 106597907 A 4/2017

(Continued)

OTHER PUBLICATIONS

International Search Report dated Apr. 23, 2023 issued in PCT/CN2023/080812.

(Continued)

*Primary Examiner* — David Luo

(74) *Attorney, Agent, or Firm* — K&L Gates LLP

(57) ABSTRACT

A bootstrap drive circuit, a motor controller, a compressor, and a vehicle are provided. The bootstrap drive circuit includes a bootstrap unit, a negative voltage unit, a drive unit, and a voltage stabilization unit. The bootstrap unit is configured to provide the voltage stabilization unit with a bootstrap voltage. The voltage stabilization unit is configured to perform a voltage stabilization processing on the bootstrap voltage to output a stable drive voltage to the drive unit. The drive unit is configured to drive, in response to receiving a turn-on control signal and based on the stable (Continued)

drive voltage, a switch tube corresponding to the drive unit to be turned on, and to control, in response to receiving a turn-off control signal, the negative voltage unit to drive the switch tube to be turned off by generating a stable turn-off negative voltage based on the stable drive voltage.

18 Claims, 9 Drawing Sheets

(58) Field of Classification Search
CPC ........... H03K 17/063; H03K 17/08122; H03K 2017/066; H03K 2217/0081; H02P 27/06
USPC .................................................. 318/504, 494
See application file for complete search history.

(56) References Cited

U.S. PATENT DOCUMENTS

| | | | | |
|---|---|---|---|---|
| 2013/0214757 | A1 | 8/2013 | Lee et al. | |
| 2015/0042298 | A1 | 2/2015 | Kung et al. | |
| 2015/0318788 | A1 | 11/2015 | Kovacic et al. | |
| 2020/0044554 | A1 | 2/2020 | Penzo et al. | |
| 2021/0028782 | A1 | 1/2021 | Ye et al. | |
| 2024/0204777 | A1 * | 6/2024 | Hara | H02M 3/07 |

FOREIGN PATENT DOCUMENTS

| | | | |
|---|---|---|---|
| CN | 108880206 | A | 11/2018 |
| CN | 110190732 | A | 8/2019 |
| CN | 111865053 | A | 10/2020 |
| CN | 113437858 | A | 9/2021 |
| CN | 214544101 | U | 10/2021 |
| CN | 114465454 | A | 5/2022 |
| JP | 2008017625 | A | 1/2008 |
| JP | 2010019894 | A | 1/2010 |
| JP | 2012196065 | A | 10/2012 |
| JP | 2018046736 | A | 3/2018 |

OTHER PUBLICATIONS

Written Opinion dated Apr. 23, 2023 issued in PCT/CN2023/080812.
Extended European search report dated May 14, 2025 received in European patent Applicatin No. 23787450.8.
Notice of Reasons for Refusal dated Jul. 1, 2025 received in Japanese Patent Application No. 2024-545036.
First Office Action dated May 20, 2022 received in Chinese Patent Application No. 202210378498.X.
Xie, E. et al., "Problems and Improvment in the Design of Main Power Circuit", Design and Analysis, 2008, pp. 7-9.
Notification to Grant Patent Right for Invention dated Jun. 10, 2022 received in Chinese Patent Application No. 202210378498.X.

* cited by examiner

BOOTSTRAP DRIVE CIRCUIT, MOTOR CONTROLLER, COMPRESSOR, AND VEHICLE

CROSS-REFERENCES TO RELATED APPLICATIONS

This application is a continuation application of PCT International Patent Application No. PCT/CN2023/080812 filed on Mar. 10, 2023, which claims priority to Chinese Patent Application No. 202210378498.X filed on Apr. 12, 2022, the entire contents of each of which are incorporated herein by reference for all purposes. No new matter has been introduced.

FIELD

The present disclosure relates to the field of drive control technologies, and more particularly, to a bootstrap drive circuit, a motor controller, a compressor, and a vehicle.

BACKGROUND

A third-generation semiconductor represented by silicon carbide (SiC) has a high switch frequency, high withstand voltage and temperature resistance performance, and a smaller volume than a Silicon (Si) device under the same performance, and has a wide application prospect in the fields of electric vehicles and the like. In order to drive a power device to be reliably turned off, a power device represented by SiC generally needs a negative voltage to ensure that the power device is reliably turned off. However, in the related art, when the power device is turned off at a negative voltage, it is possible to exceed a negative voltage fluctuation range allowed by the power device.

SUMMARY

The present disclosure aims to solve at least one of the technical problems in the related art to some extent. To this end, a first objective of the present disclosure is to provide a bootstrap drive circuit, which performs a voltage stabilization processing on a bootstrap voltage through a voltage stabilization unit, thereby lowering fluctuations of a drive voltage, and enhancing reliability of the bootstrap drive circuit.

A second objective of the present disclosure is to provide a motor controller.

A third objective of the present disclosure is to provide a compressor.

A fourth objective of the present disclosure is to provide a vehicle.

In order to achieve the above objectives, an embodiment of the first aspect of the present disclosure provides a bootstrap drive circuit, including a bootstrap unit, a negative voltage unit, a drive unit, and a voltage stabilization unit. The bootstrap unit is configured to provide the voltage stabilization unit with a bootstrap voltage; the voltage stabilization unit is configured to perform a voltage stabilization processing on the bootstrap voltage to output a stable drive voltage to the drive unit; and the drive unit is configured to drive, in response to receiving a turn-on control signal and based on the stable drive voltage, a switch tube corresponding to the drive unit to be turned on, and to control, in response to receiving a turn-off control signal, the negative voltage unit to drive the switch tube to be turned off by generating a stable turn-off negative voltage based on the stable drive voltage.

With the bootstrap drive circuit according to the embodiments of the present disclosure, the bootstrap unit provides the bootstrap voltage to the voltage stabilization unit. The voltage stabilization unit performs a voltage stabilization processing on the bootstrap voltage to output the stable drive voltage to the drive unit. The drive unit is configured to drive, in response to receiving a turn-on control signal and based on the stable drive voltage, the switch tube corresponding to the drive unit to be turned on, and to control, in response to receiving a turn-off control signal, the negative voltage unit to generate the stable turn-off negative voltage based on the stable drive voltage, such that the drive unit drives the switch tube to be turned off according to the stable turn-off negative voltage. Therefore, the circuit performs a voltage stabilization processing on the bootstrap voltage through the voltage stabilization unit, which reduces the fluctuation of the drive voltage and enhances the reliability of the bootstrap drive circuit.

According to an embodiment of the present disclosure, an input terminal of the voltage stabilization unit is connected to an output terminal of the bootstrap unit; a reference ground terminal of the voltage stabilization unit is connected to a negative electrode terminal of the bootstrap unit and a power-supply negative-electrode pin of the drive unit; an output terminal of the voltage stabilization unit is connected to a power-supply positive-electrode pin of the drive unit; an output pin of the drive unit is connected to a positive terminal of the negative voltage unit; and a negative terminal of the negative voltage unit is connected to a control terminal of the switch tube.

According to an embodiment of the present disclosure, the voltage stabilization unit includes a linear voltage stabilization source or a switch power supply.

According to an embodiment of the present disclosure, the switch tube is an upper bridge switch tube of an inverter circuit.

According to an embodiment of the present disclosure, the bootstrap drive circuit further includes a charging control unit configured to control, when the switch tube is turned on, the negative voltage unit to charge, to perform a secondary voltage stabilization processing on the turn-off negative voltage generated by the negative voltage unit.

According to an embodiment of the present disclosure, the charging control unit includes: a controllable switch module connected between a negative terminal of the negative voltage unit and a negative electrode terminal of the bootstrap unit; and a logic control module configured to control the controllable switch module to be turned on, to charge the negative voltage unit through the drive voltage.

According to an embodiment of the present disclosure, the logic control module is further configured to obtain a voltage across two terminals of the negative voltage unit, and control, in response to the negative voltage unit being determined as undervoltage based on the voltage across the two terminals of the negative voltage unit during rising edges of the drive voltage outputted by the drive unit, the controllable switch module to be turned on.

According to an embodiment of the present disclosure, the logic control module is further configured to control, during rising edges of the drive voltage outputted by the drive unit, the controllable switch module to be turned on.

According to an embodiment of the present disclosure, the controllable switch module includes a metal oxide semiconductor (MOS) tube and a current-limiting resistor.

The current-limiting resistor is connected between a drain electrode of the MOS tube and the negative terminal of the negative voltage unit; or the current-limiting resistor is connected between a source electrode of the MOS tube and the negative electrode terminal of the bootstrap unit.

According to an embodiment of the present disclosure, in response to the MOS tube having a body diode, the controllable switch module further includes a first diode having an anode connected to the source electrode of the MOS tube and a cathode connected to the negative electrode terminal of the bootstrap unit.

According to an embodiment of the present disclosure, the bootstrap unit includes: a power supply having a negative electrode terminal that is grounded; a bootstrap diode having an anode connected to a positive electrode terminal of the power supply; a bootstrap resistor having one terminal connected to a cathode of the bootstrap diode; and a bootstrap capacitor. A positive electrode terminal of the bootstrap capacitor is connected to another terminal of the bootstrap resistor and has a first node. A negative electrode terminal of the bootstrap capacitor is connected to the reference ground terminal of the voltage stabilization unit. The first node is used as the output terminal of the bootstrap unit.

According to an embodiment of the present disclosure, the negative voltage unit includes: a negative voltage capacitor having a positive electrode terminal connected to the output pin of the drive unit and a negative electrode terminal used as a negative terminal of the negative voltage unit; and a first voltage stabilization tube having an anode connected to the negative electrode terminal of the negative voltage capacitor and a cathode connected to the positive electrode terminal of the negative voltage capacitor.

In order to achieve the above objectives, an embodiment of the second aspect of the present disclosure provides a motor controller, including: an inverter circuit; and the bootstrap drive circuit as described above. The bootstrap drive circuit is configured to drive a switch tube in the inverter circuit to be turned on or turned off.

With the motor controller according to the embodiments of the present disclosure, through the bootstrap drive circuit as described above, a stabilization processing is performed on the bootstrap voltage through the voltage stabilization unit, which lowers the fluctuation of the drive voltage and enhances reliability of the motor controller.

According to an embodiment of the present disclosure, the inverter circuit is a three-phase bridge inverter circuit, a single-phase full-bridge inverter circuit, or a single-phase half-bridge inverter circuit.

To achieve the foregoing objectives, an embodiment of the third aspect of the present disclosure provides a compressor, including: a motor and the motor controller as described above. The motor controller is configured to drive the motor to operate.

With the compressor according to the embodiments of the present disclosure, through the above motor controller, a stabilization processing is performed on the bootstrap voltage through the voltage stabilization unit, which lowers the fluctuation of the drive voltage, enhances the reliability of the motor controller, and further enhances reliability of the compressor.

To achieve the above objectives, an embodiment of the fourth aspect of the present disclosure provides a vehicle, including the above compressor.

With the vehicle according to the embodiments of the present disclosure, through the above compressor, a stabilization processing is performed on the bootstrap voltage through the voltage stabilization unit, which lowers the fluctuation of the drive voltage, enhances the reliability of the compressor, and further enhances reliability of the vehicle.

Additional aspects and advantages of the present disclosure will be provided in part in the following description, or will become apparent in part from the following description, or can be learned from practicing of the present disclosure.

DETAILED DESCRIPTION

Figure 1:
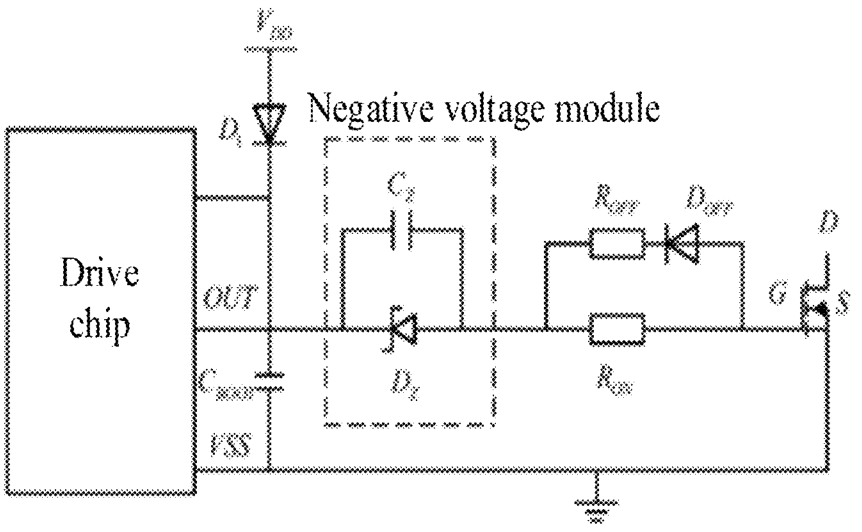
FIG. 1 is a circuit topology diagram of a related bootstrap drive circuit.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

FIG. 1 is a circuit topology diagram of a related bootstrap drive circuit. As shown in FIG. 1, a negative voltage module is formed by connecting a capacitor Cz and a voltage stabilization diode Dz in parallel. When a switch tube needs to be turned on, an OUT pin voltage of a drive chip is VDD-V1 (VDD is a power supply voltage, and V1 is a turn-on voltage of a diode D1), and the voltage is applied to a grid of the switch tube after passing through the voltage stabilization diode Dz. A grid drive voltage of the switch tube is VDD-V1-Vz (Vz is a stable voltage of the voltage stabilization diode Dz), and the switch tube is turned on. When the switch tube needs to be turned off, the OUT pin voltage of the drive chip is reduced to 0. When the switch tube is turned on, a potential at a left terminal of the capacitor Cz is higher than a potential at a right terminal of the capacitor Cz, and a voltage across two terminals of the capacitor Cz is Vz and cannot be mutated. Therefore, when the switch tube is turned off, potentials across the two terminals of the capacitor Cz are always kept high at left terminal and low at right terminal, and a difference between the two potentials across the two terminals of the capacitor Cz is always Vz. Therefore, when the OUT pin voltage of the drive chip is reduced to 0, the potential at the left terminal of the capacitor Cz is 0, and the potential at the right terminal of the capacitor Cz is kept to −Vz. In this case, the grid drive voltage of the switch tube is −Vz, and the switch tube is turned off at the negative voltage.

Since stability of the voltage across the two terminals of the capacitor Cz, i.e., the negative voltage is not only related to the voltage stabilization diode Dz, but also related to a duty ratio of a drive signal, a change in the duty ratio causes the negative voltage to be unstable, especially when fluctuations also occur in a bootstrap voltage of an upper bridge arm, i.e., a voltage across two terminals of a bootstrap capacitor CBOOT, the negative voltage is more unstable. In this way, the grid drive voltage of the switch tube will also be affected and become unstable, resulting in a decrease in circuit performance of the entire circuit. Therefore, it is necessary to strictly control the fluctuation of the bootstrap voltage.

To this end, an embodiment of the present disclosure provides a bootstrap drive circuit, which lowers a fluctuation of the drive voltage and enhances reliability of the bootstrap drive circuit by performing a voltage stabilization processing on the bootstrap voltage through a voltage stabilization unit.

Figure 2:
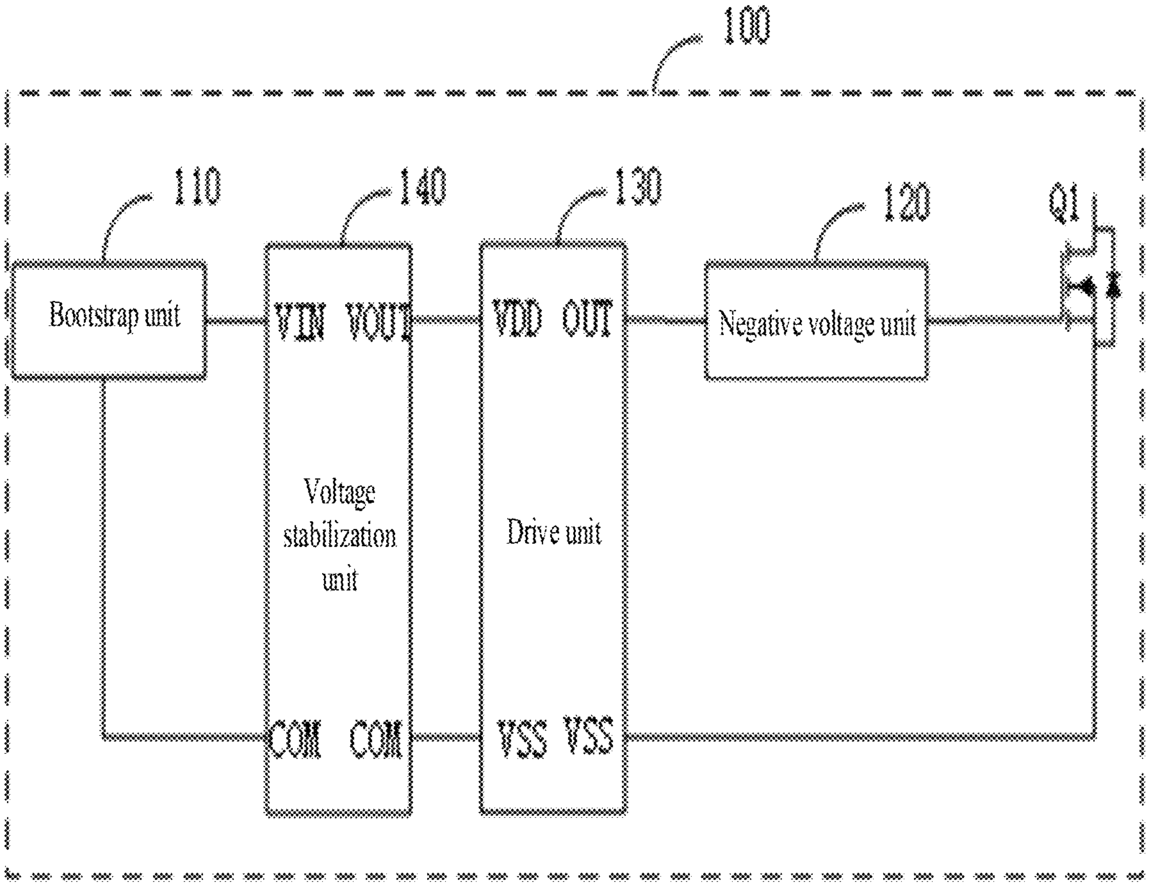
FIG. 2 is a schematic structural diagram of a bootstrap drive circuit according to an embodiment of the present disclosure.

FIG. 2 is a schematic structural diagram of a bootstrap drive circuit according to an embodiment of the present disclosure. As shown in FIG. 2, the bootstrap drive circuit 100 may include a bootstrap unit 110, a negative voltage unit 120, a drive unit 130, and a voltage stabilization unit 140.

The bootstrap unit 110 is configured to provide the voltage stabilization unit 140 with a bootstrap voltage. The voltage stabilization unit 140 is configured to perform a voltage stabilization processing on the bootstrap voltage to output a stable drive voltage to the drive unit 130. The drive unit 130 is configured to drive, in response to receiving a turn-on control signal and based on the stable drive voltage, a switch tube Q1 corresponding to the drive unit 130 to be turned on, and to control, in response to receiving a turn-off control signal, the negative voltage unit 120 to drive the switch tube Q1 to be turned off by generating a stable turn-off negative voltage based on the stable drive voltage.

It should be noted that the voltage stabilization unit 140 may include a power supply having a low voltage loss (i.e., a voltage stabilization function), such as a linear voltage stabilization source or a switch power supply. The switch tube Q1 may be a switch tube such as a metal oxide semiconductor (MOS) tube and an insulated-gate bipolar (IGBT) tube that requires a negative voltage to be turned off, which is not limited herein. When the circuit is applied to an inverter circuit, the switch tube Q1 may be an upper bridge switch tube of the inverter circuit.

Exemplarily, as shown in FIG. 2, an input terminal VIN of the voltage stabilization unit 140 is connected to an output terminal of the bootstrap unit 110. A reference ground terminal COM of the voltage stabilization unit 140 is connected to a negative electrode terminal of the bootstrap unit 110 and a power-supply negative-electrode pin VSS of the drive unit 130. An output terminal VOUT of the voltage stabilization unit 140 is connected to a power-supply positive-electrode pin VDD of the drive unit 130, so that the bootstrap voltage outputted by the bootstrap unit 110 provides the drive unit 130 with a stable drive voltage after processed by the voltage stabilization unit 140. An output pin OUT of the drive unit 130 is connected to a positive terminal of the negative voltage unit 120, and a negative terminal of the negative voltage unit 120 is connected to the control terminal of the switch tube Q1.

When the switch tube Q1 needs to be controlled to be turned on based on the control requirement, the output pin OUT of the drive unit 130 is connected to the power supply pin VDD. After the voltage stabilization unit 140 performs a voltage stabilization processing on the bootstrap voltage outputted by the bootstrap unit 110, the stable drive voltage is transmitted to the drive unit 130. At this time, a voltage of the output pin OUT of the drive unit 130 is the same as the drive voltage provided by the voltage stabilization unit 140 (denoted as Vcc), and is provided to the grid of the switch tube Q1 after passing through the negative voltage unit 120. The grid drive voltage of the switch tube Q1 is a difference between the voltage of the output pin OUT of the drive unit 130 and the voltage across the two terminals of the negative voltage unit 120 (i.e., Vcc-Vcn, Vcn is the voltage across the two terminals of the negative voltage unit 120), and the switch tube Q1 is turned on.

When the switch tube Q1 needs to be controlled to be turned off based on the control requirement, the output pin OUT of the drive unit 130 is connected to a ground pin VSS. At this time, the voltage of the output pin OUT of the drive unit 130 is the same as the voltage of the ground pin VSS, and the voltage of the output pin OUT of the drive unit 130 and the voltage of the ground pin VSS are each 0. Based on a characteristic where the voltage across the two terminals of the negative voltage unit 120 does not suddenly change, the negative voltage unit 120 provides a turn-off negative voltage (i.e., −Vcn) to the grid of the switch tube Q1. Since the drive voltage of the drive unit 130 is subjected to a voltage stabilization processing performed by the voltage stabilization unit 140 and generates no fluctuation—, the grid of the switch tube Q1 obtains a stable turn-off negative voltage (i.e., a stable −Vcn), thereby ensuring the stable turn-off of the switch tube Q1.

In the bootstrap drive circuit according to the above embodiments, by performing a voltage stabilization processing on the bootstrap voltage through the voltage stabilization unit, the fluctuation of the drive voltage is lowered, and the reliability of the bootstrap drive circuit is enhanced.

Figure 3:
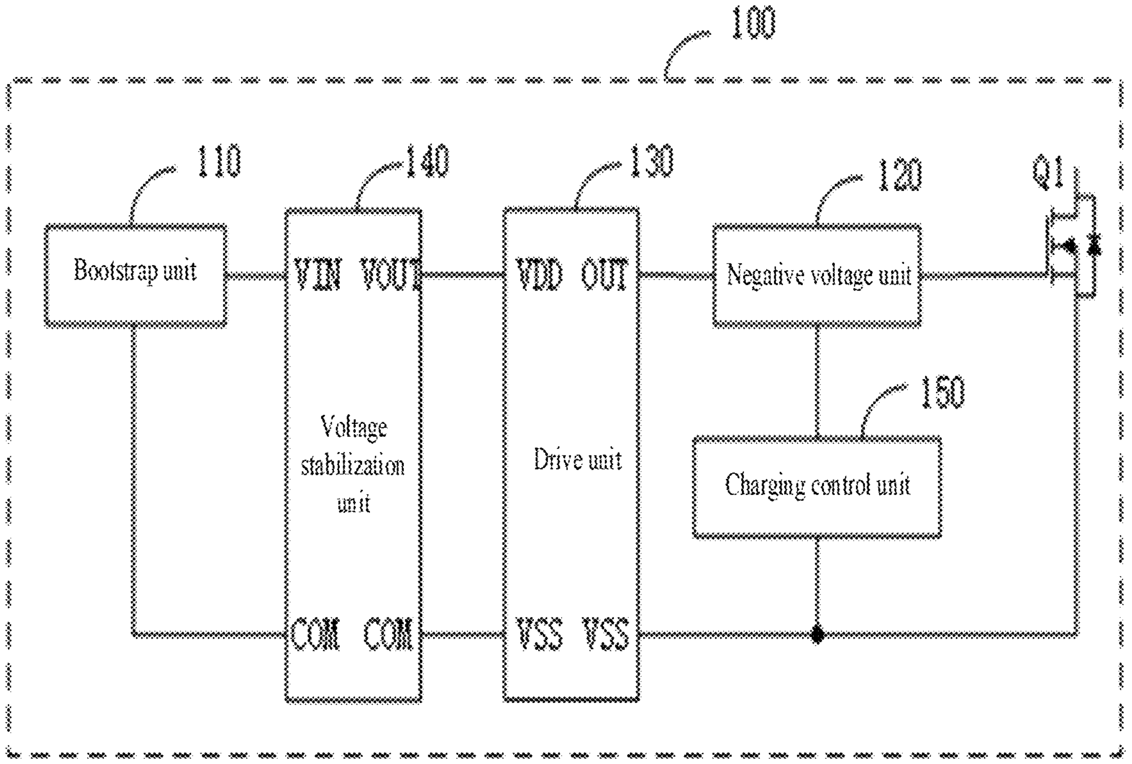
FIG. 3 is a schematic structural diagram of a bootstrap drive circuit according to another embodiment of the present disclosure.

In some embodiments of the present disclosure, as shown in FIG. 3, the bootstrap drive circuit 100 further includes a charging control unit 150. The charging control unit 150 is configured to control the negative voltage unit 120 to charge when the switch tube Q1 is turned on, to perform a secondary voltage stabilization processing on the turn-off negative voltage generated by the negative voltage unit 120.

It should be noted that the negative voltage unit 120 is further configured to stabilize a turn-on positive voltage of the switch tube Q1 during charging.

That is, the bootstrap drive circuit 100 includes not only the voltage stabilization unit 140, but also the charging control unit 150. The voltage stabilization unit 140 can perform a voltage stabilization processing on the bootstrap voltage to ensure stability of the bootstrap voltage, thereby ensuring stability of the voltage supplied to the negative voltage unit 120, and effectively solving a problem of instability of the drive voltage of the switch tube and the turn-off negative voltage caused by instability of the bootstrap voltage. The charging control unit 150 can provide a charging path for the negative voltage unit 120, so that the voltage across the two terminals of the negative voltage unit 120 is made stable, which effectively solves the influence on the turn-off negative voltage due to the change of the duty ratio of the drive signal, thereby improving the stability of the drive voltage and the turn-off negative voltage from two aspects, and improving the reliability of the bootstrap drive circuit.

Exemplarily, when the switch tube Q1 needs to be controlled to be turned on based on the control requirement, the output pin OUT of the drive unit 130 is connected to the power supply pin VDD, and the bootstrap voltage outputted by the bootstrap unit 110 is transmitted to the drive unit 130 after being subjected to a voltage stabilization processing through the voltage stabilization unit 140. At this time, the voltage of the output pin OUT of the drive unit 130 is the same as the drive voltage provided by the voltage stabilization unit 140 (denoted as Vcc), and is supplied to the grid of the switch tube Q1 after passing through the negative voltage unit 120. The grid drive voltage of the switch tube Q1 is the difference between the voltage of the output pin OUT of the drive unit 130 and the voltage across the two terminals of the negative voltage unit 120 (i.e., Vcc-Vcn, Von is the voltage across the two terminals of the negative voltage unit 120), and the switch tube Q1 is turned on. During the turn-on of the switch tube Q1, the negative voltage unit 120 is controlled by the charging control unit 150 to charge, so that the voltage across the two terminals of the negative voltage unit 120 reaches stability. When the voltage is stable, the grid drive voltage of the corresponding switch tube Q1 is also stable, i.e., the turn-on positive voltage of the switch tube Q1 is stable, allowing the switch tube Q1 to be in a stable turn-on state.

When the switch tube Q1 needs to be controlled to be turned off based on the control requirement, the output pin OUT of the drive unit 130 is connected to the ground pin VSS. At this time, the voltage of the output pin OUT of the drive unit 130 is the same as the voltage of the ground pin VSS, and the voltage of the output pin OUT of the drive unit 130 and the voltage of the ground pin VSS are each 0. Based on the characteristic where the voltage across the two terminals of the negative voltage unit 120 does not suddenly change, the negative voltage unit 120 provides a turn-off negative voltage (i.e., –Vcn) to the grid of the switch tube Q1. Since the switch tube Q1 is turned on, not only is voltage stabilization performed on the bootstrap voltage, but compensation is also performed on the voltage across the two terminals of the negative voltage unit 120, so that the voltage across the two terminals of the switch tube Q1 is in a stable state. Therefore, the grid of the switch tube Q1 will obtain a stable turn-off negative voltage (i.e., the stable –Vcn), thereby ensuring the stable turn-off of the switch tube Q1.

In the above embodiments, a voltage stabilization processing on is performed on the bootstrap voltage through the voltage stabilization unit, and the turn-off negative voltage generated by the negative voltage unit is compensated through the charging control unit, which can greatly improve the stability of the drive voltage of the switch tube and the turn-off negative voltage, enabling the switch tube to be stably turned on and off, and improving the reliability of the circuit.

Figure 4:
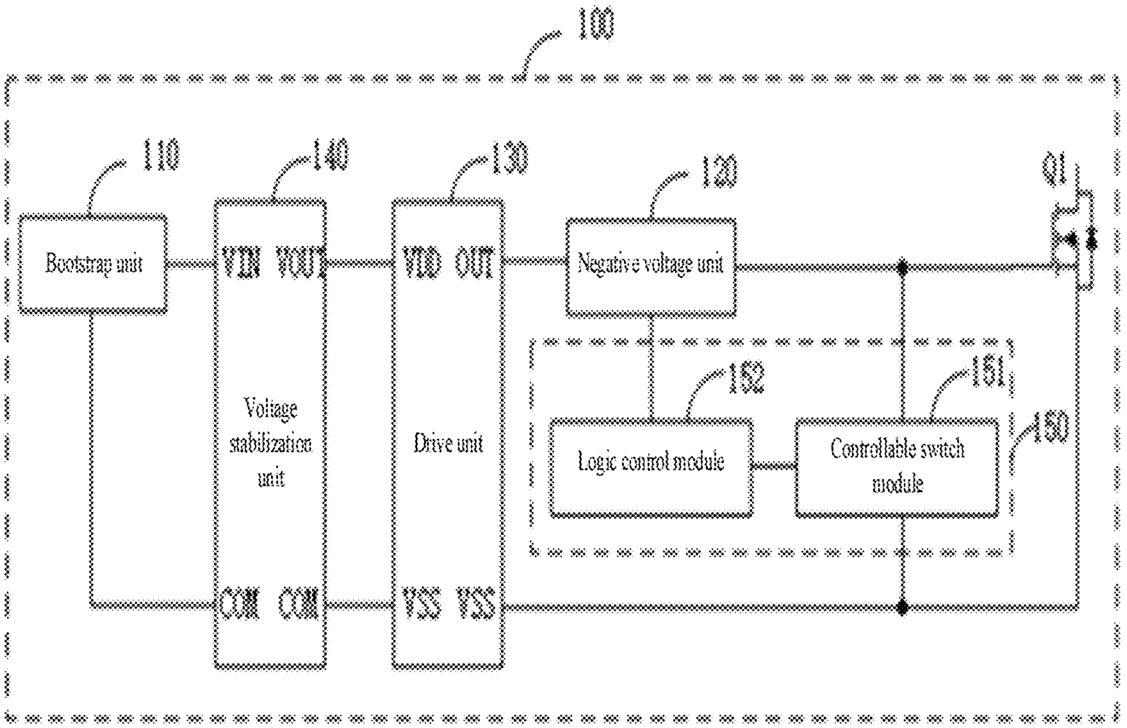
FIG. 4 is a schematic structural diagram of a bootstrap drive circuit according to yet another embodiment of the present disclosure.

In some embodiments of the present disclosure, as shown in FIG. 4, the charging control unit 150 may include a controllable switch module 151 and a logic control module 152. The controllable switch module 151 is connected between a negative terminal of the negative voltage unit 120 and a negative electrode terminal of the bootstrap unit 110, and the logic control module 152 is configured to control the controllable switch module 151 to be turned on, to charge the negative voltage unit 120 through the drive voltage.

Optionally, the controllable switch module 151 includes a MOS tube and the like, to provide a charging path for the negative voltage unit 120 by controlling the turn-on of the MOS tube and the like, which further realizes charging for the negative voltage unit 120, to implement the compensation of the turn-off negative voltage.

Exemplarily, as shown in FIG. 4, when the switch tube Q1 needs to be controlled to be turned on, the output pin OUT of the drive unit 130 is connected to the power supply pin VDD. The bootstrap voltage outputted by the bootstrap unit 110 is subjected to stabilization processing by the voltage stabilization unit 140 and then is transmitted to the drive unit 130. The voltage of the output pin OUT of the drive unit 130 and the voltage of the power supply pin VDD are the same and are each the drive voltage. After passing through the negative voltage unit 120, the voltage is supplied to the switch tube Q1 to turn on the switch tube Q1. In this process, the logic control module 152 may timely and temporarily control the controllable switch module 151 such as the MOS tube to be in an on state. At this time, the bootstrap unit 110 forms a charging path through the voltage stabilization unit 140, the power supply pin VDD and the output pin OUT of the drive unit 130 and the negative voltage unit 120, and the controllable switch module 151, and the drive voltage provided by the bootstrap unit 110 charges the negative voltage unit 120 to ensure that the voltage across the two terminals of the negative voltage unit 120 is in the stable state, thereby ensuring the stable turn-on of the switch tube Q1. When the switch tube Q1 needs to be controlled to be turned off, the logic control module 152 controls the controllable switch module 151, such as the MOS tube, to be in an off state, and the output pin OUT of the drive unit 130 is connected to the ground pin VSS. Based on the characteristic where the voltage across the two terminals of the negative voltage unit 120 does not suddenly change, the negative voltage unit 120 provides a stable turn-off negative voltage to the switch tube Q1, thereby ensuring the stable turn-off of the switch tube Q1.

In this embodiment, by providing the controllable switch module 151, such as the MOS tube, and by performing on-off control of the controllable switch module 151, charging control on the negative voltage unit 120 can be realized, enabling the negative voltage unit 120 to provide a stable turn-off negative voltage. Meanwhile, the stability of the drive voltage of the switch tube Q1 is ensured. The circuit structure is simple, easy to implement, and low in cost and small in occupied volume.

In some embodiments of the present disclosure, the logic control module 152 is further configured to control the controllable switch module 151 to be turned on according to a fixed frequency or a random frequency.

It should be noted that the fixed frequency herein is independent of a switch frequency of the drive signal, and may be specifically set according to an actual situation. When the controllable switch module 151 is controlled to be turned on according to the fixed frequency, without requiring external triggering, the controllable switch module 151 can be controlled to be turned on once by the logic control module 152 according to a fixed interval, and be controlled to be turned off after continuing to turn on for a short time. The step is cyclically executed to charge the negative voltage unit 120.

Since the fixed frequency is independent of the drive signal, there may exist a case where the controllable switch module 151 is turned on and the switch tube Q1 is not turned on. When the switch tube Q1 is not turned on, the power supply pin VDD of the drive unit 130 is disconnected from the output pin OUT. At this time, a drive power supply does not charge the negative voltage unit 120. When the switch tube Q1 is turned on, the power supply pin VDD of the drive unit 130 is connected to the output pin OUT. At this time, the drive power supply charges the negative voltage unit 120.

In this manner, there is no need for external triggering, i.e., no feedback signal is required, which is easy to implement. However, whether the turn-on of the controllable switch module 151 can charge the negative voltage unit 120 is random. When the duty ratio of the drive signal is low, the negative voltage unit 120 may not be effectively charged for a long time. Meanwhile, when the drive power supply charges the negative voltage unit 120, the grid drive voltage of the switch tube Q1 is brought down, resulting in the occurrence of distortion of a circuit corresponding to the switch tube Q1, such as an output current of the inverter circuit. Meanwhile, since the frequency is fixed, a harmonic frequency generated on the output current will also be concentrated at one or several points, which is not conducive to electromagnetic compatibility design. Therefore, this manner is applicable to a case where the performance requirement for the circuit like the inverter circuit is low and no low duty ratio occurs, to ensure the stable on-off of the switch tube Q1 1 in this case and ensure the circuit performance.

It should be noted that the random frequency refers to a random jitter frequency, i.e., a turn-on moment of the controllable switch module 151 is not fixed, so that a problem where the harmonic frequency generated on the output current during use of the fixed frequency is concentrated at a predetermined or several points can be solved, thereby being beneficial to the design of electromagnetic compatibility. This manner is also applicable to a case where the performance requirement for the circuit such as the inverter circuit is low and no low duty ratio occurs, to ensure the stable on-off of the switch tube Q1 in this case and ensure the circuit performance.

In some other embodiments of the present disclosure, the logic control module 152 is further configured to obtain a voltage across two terminals of the negative voltage unit 120, and control, in response to the negative voltage unit 120 being determined as undervoltage according to the voltage across the two terminals of the negative voltage unit 120, the controllable switch module 151 to be turned on.

Exemplarily, the logic control module 152 may sample the voltage across the two terminals of the negative voltage unit 120. When the voltage across the two terminals of the negative voltage unit 120 is lower than a predetermined threshold (which may be set according to the actual situation), the logic control module 152 controls the controllable switch module 151 to be turned on briefly to charge the negative voltage unit 120 through the drive power supply.

In this way, the switch frequency of the controllable switch module 151 can be lowered to the minimum, i.e., the controllable switch module 151 is turned on only when the negative voltage unit 120 is undervoltage. Moreover, according to a simulation result, the controllable switch module 151 is turned on once in on hundreds or even thousands of switch periods (millisecond level) of the switch tube Q1, to charge the negative voltage unit 120 to ensure the required voltage of the negative voltage unit 120. However, in this manner, when the controllable switch module 151 is turned on, there also exists the grid drive voltage of the switch tube Q1 being brought down, so that harmonics are generated on the output current. Moreover, the higher an output current frequency (when the circuit is applied to motor drive, the output current frequency is equal to a motor rotation speed multiplied by a number of motor pole-pairs), the greater the influence of the controllable switch module 151 on the generated harmonic. Therefore, the manner is applicable to a case where the performance requirement for the circuit such as the inverter circuit is not high, to ensure the stable on-off of the switch tube Q1 in this case and ensure the circuit performance.

In some other embodiments of the present disclosure, the logic control module 152 is further configured to obtain the voltage across the two terminals of the negative voltage unit 120, and control, in response to the negative voltage unit 120 being determined as undervoltage according to the voltage across the two terminals of the negative voltage unit 120 during rising edges of the drive voltage outputted by the drive unit 130, the controllable switch module 151 to be turned on.

Exemplarily, the voltage across the two terminals of the negative voltage unit 120 may be sampled by the logic control module 152. When the voltage across the two terminals of the negative voltage unit 120 is lower than a predetermined threshold (which may be set according to actual situations), the logic control module 152 controls the controllable switch module 151 to be turned on briefly during the rising edges of the drive voltage outputted by the drive unit 130 (i.e., the voltage of the output pin OUT of the drive unit 130), to charge the negative voltage unit 120 through the drive power supply.

In this way, in response to the negative voltage unit being undervoltage during the rising edges of the drive voltage, the controllable switch module 151 is controlled to be turned on, which not only allows the switch frequency of the controllable switch module 151 to be lowered to the minimum, but can also lower a distortion degree of the drive voltage, i.e., the distortion of the drive voltage is lowered by temporarily delaying the drive voltage and slightly lowering the duty ratio, and a duty ratio loss of the drive voltage generated by the turn-on of the controllable switch module 151 is only about two thousandths of the original duty ratio through simulation analysis. Such a small amplitude duty ratio loss has very little effect on the output of the circuit like the inverter circuit. Therefore, this way is applicable to the case where the requirement on the circuit such as the inverter circuit is high, to ensure the stable on-off of the switch tube Q 1 in this case, ensuring the circuit performance.

In some embodiments of the present disclosure, the logic control module 152 is further configured to control, during rising edges of the drive voltage outputted by the drive unit 130, the controllable switch module 151 to be turned on.

Exemplarily, the controllable switch module 151 may be controlled to be temporarily turned on during the rising edges of the drive voltage (i.e., the voltage of the output pin OUT of the drive unit 130) outputted by the drive unit 130 of the logic control module 152 in each switch period of the switch tube Q1, to charge the negative voltage unit 120 through the drive power supply.

In this way, the distortion degree of the drive voltage can be lowered, i.e., the distortion of the drive voltage is lowered by temporarily delaying the drive voltage and slightly reducing the duty ratio, and the duty ratio loss of the drive voltage generated by the turn-on of the controllable switch module 151 is only about two thousandths of the original duty ratio through simulation analysis. Such a small amplitude duty ratio loss has very little effect on the output of the circuit like the inverter circuit. In addition, since each switch cycle will lose a fixed duty ratio, the lost duty ratio can be automatically compensated through a closed-loop control circuit, such as the inverter circuit, or the duty ratio of each switch cycle can be actively increased to be used for charging the negative voltage unit 120, so that the problem of the occurrence of a fixed loss in each cycle can be solved. This manner is applicable to the case where the requirement for the circuit such as the inverter circuit is high, to ensure the stable on-off of the switch tube Q1 in this case, ensuring the circuit performance. Meanwhile, through software algorithm adaptation, an output current of the circuit such as the inverter circuit hardly generates additional harmonics.

In the above embodiments, the controllable switch module 151 is turned on and controlled in different manners, which not only ensures the stable on-off of the switch tube Q1 and the circuit performance, but also is applicable to different situations, and meets different actual requirements.

Figure 5:
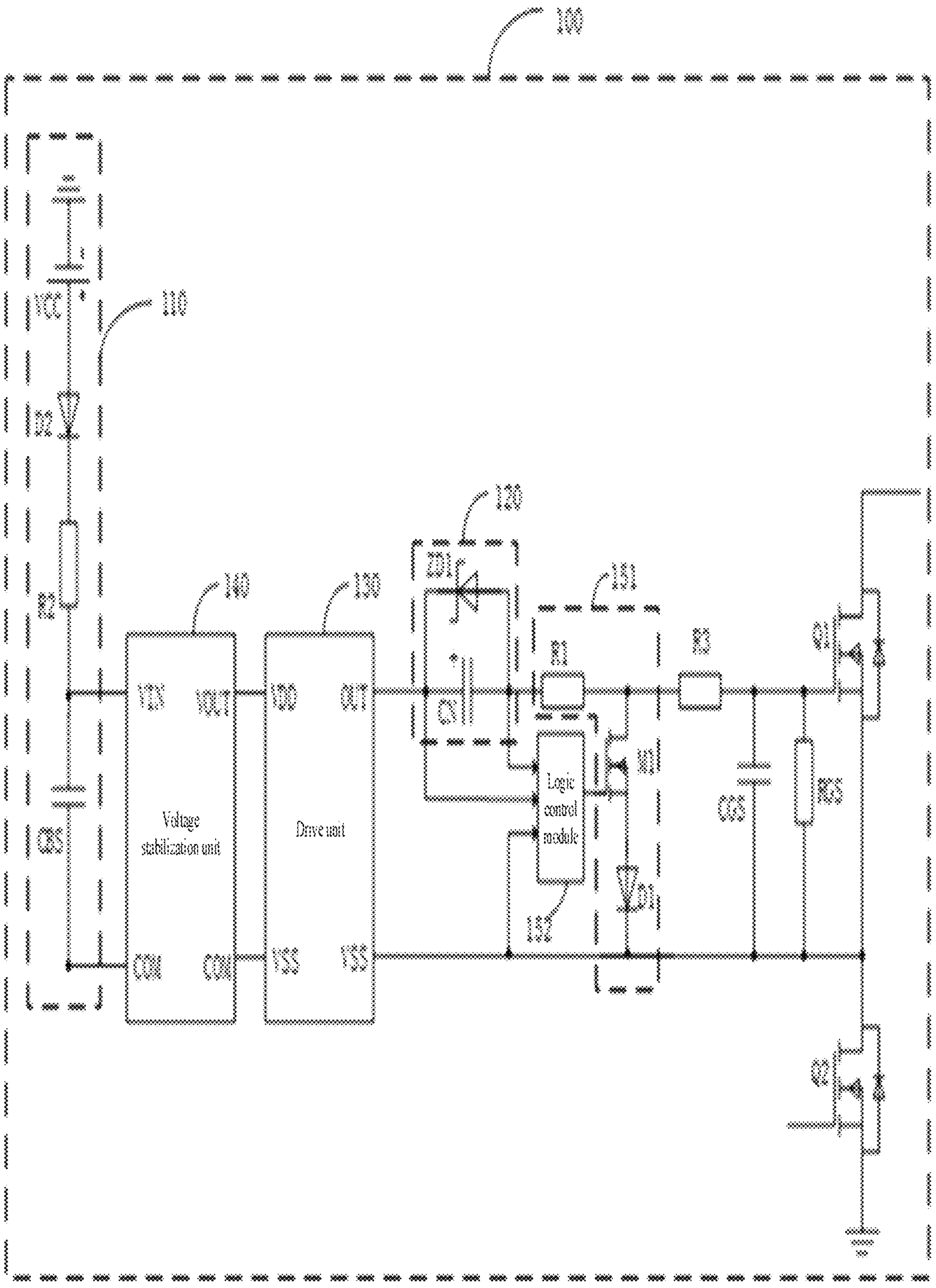
FIG. 5 is a circuit topology diagram of a bootstrap drive circuit according to an embodiment of the present disclosure.

In some embodiments of the present disclosure, referring to FIG. 5, the controllable switch module 151 includes a metal oxide semiconductor (MOS) tube M1 and a current-limiting resistor R1. The current-limiting resistor R1 is connected between a drain electrode of the MOS tube M1 and the negative terminal of the negative voltage unit 120; or the current-limiting resistor R1 is connected between a source electrode of the MOS tube M1 and the negative electrode terminal of the bootstrap unit 110, to limit a charging current of the negative voltage unit 120, thereby controlling a charging speed of the negative voltage unit 120.

It should be noted that, as shown in FIG. 5, when the current-limiting resistor R1 is connected between the drain electrode of the MOS tube M1 and the negative terminal of the negative voltage unit 120, the current-limiting resistor R1 not only can limit the charging current of the negative voltage unit 120, but can also limit the drive current of the switch tube Q1, and a drive resistor of the switch tube Q1 is a resistor after the current-limiting resistor R1 and a resistor R3 are connected in series.

In some embodiments of the present disclosure, referring to FIG. 5, in response to the MOS tube M1 having a body diode, the controllable switch module 151 further includes a first diode D1 having an anode connected to the source electrode of the MOS tube M1 and a cathode connected to the negative electrode terminal of the bootstrap unit 110. Thus, the negative voltage unit 120 can be prevented from reversely discharging through the body diode of the MOS tube M1.

It should be noted that the first diode D1 may also be disposed between the drain electrode of the MOS tube M1 and the negative terminal of the negative voltage unit 120. In addition, when the MOS tube M1 has no body diode, the negative voltage unit 120 cannot be reversely discharged through the MOS tube M1. Therefore, when the MOS tube M1 has no body diode, the first diode D1 may not be provided to save costs.

In some embodiments of the present disclosure, as shown in FIG. 5, the bootstrap unit 110 may include a power supply VCC, a bootstrap diode D2, a bootstrap resistor R2, and a bootstrap capacitor CBS. A negative electrode terminal of the power supply VCC is grounded. An anode of the bootstrap diode D2 is connected to a positive electrode terminal of the power supply VCC. The bootstrap resistor R2 has one terminal connected to a cathode of the bootstrap diode D2. A positive electrode terminal of the bootstrap capacitor CBS is connected to another terminal of the bootstrap resistor R2 and has a first node. A negative electrode terminal of the bootstrap capacitor CBS is connected to the reference ground terminal COM of the voltage stabilization unit 140. The first node is used as the output terminal of the bootstrap unit 110.

Further, as shown in FIG. 5, the negative voltage unit 120 includes a negative voltage capacitor CN and a first voltage stabilization tube ZD1. A positive electrode terminal of the negative voltage capacitor CN is connected to the output pin OUT of the drive unit 130, and a negative electrode terminal of the negative voltage capacitor CN is used as a negative terminal of the negative voltage unit 120. An anode of the first voltage stabilization tube ZD1 is connected to the negative electrode terminal of the negative voltage capacitor CN, and a cathode of the first voltage stabilization tube ZD1 is connected to the positive electrode terminal of the negative voltage capacitor CN.

Exemplarily, when the switch tube Q1 needs to be turned on, the power supply pin VDD of the drive unit 130 is connected to the output pin OUT, the bootstrap capacitor CBS provides a drive voltage to the negative voltage unit 120 through the voltage stabilization unit 140, the power supply pin VDD of the drive unit 130, and the output pin OUT, and the drive voltage Vcc is the output voltage of the voltage stabilization unit 140. In the negative voltage unit 120, the voltage across the two terminals of the negative voltage capacitor CN is Vcn (it should be noted that, in order to ensure that the drive voltage and the turn-off negative voltage of the switch tube Q1 are stable at an initial stage of operation, before the circuit operates, the MOS tube M1 may be controlled to be turned on briefly to pre-charge the negative voltage capacitor CN to ensure that the circuit is in a stable voltage state), and the grid drive voltage of the switch tube Q1 is Vcc-Vcn, thereby drive the switch tube Q1 to be turned on.

When the switch tube Q1 needs to be turned off, the ground pin VSS of the drive unit 130 is connected to the output pin OUT. Since the voltage across the two terminals of the negative voltage capacitor CN cannot be mutated, the voltage of the negative electrode terminal of the negative voltage capacitor CN is −Vcn, thereby providing a turn-off negative voltage to the switch tube Q1, so that the switch tube Q1 is turned off at the negative voltage.

In a process of controlling the on-off of the switch tube Q1, the logic control module 152 may perform turn-on control on the MOS tube M1 based on any one of the foregoing five manners, to charge the negative voltage capacitor CN through the drive power supply and to compensate the voltage Vcn across the two terminals of the negative voltage capacitor CN to ensure that the switch tube Q1 is in a stable state, thereby ensuring the stability of the drive voltage, i.e., the turn-on positive voltage when the switch tube Q1 is turned on and the stability of the turn-off negative voltage when the switch tube Q1 is turned off. Therefore, the stable on-off of the switch tube Q1 is ensured.

Figure 6:
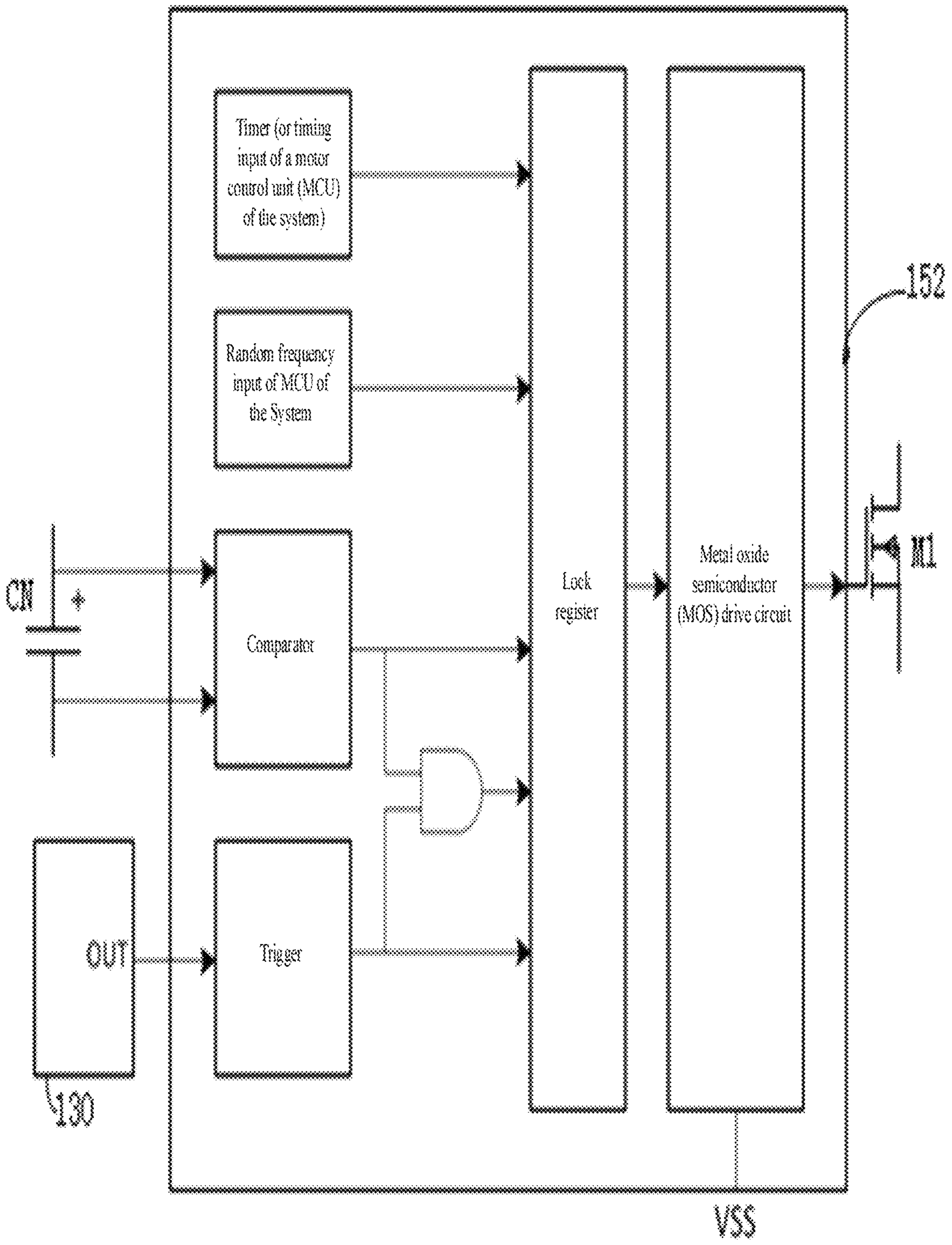
FIG. 6 is a schematic block diagram of a logic control module according to an embodiment of the present disclosure.

In some embodiments of the present disclosure, an internal schematic diagram of the logic control module 152 is shown in FIG. 6. Referring to FIG. 5 and FIG. 6, the MOS tube M1 is controlled by the logic control module 152 to be turned on, to describe charging of the negative voltage capacitor CN.

Exemplarily, the MOS tube M1 is controlled by the logic control module 152 to be turned on according to the fixed frequency.

Figure 7:
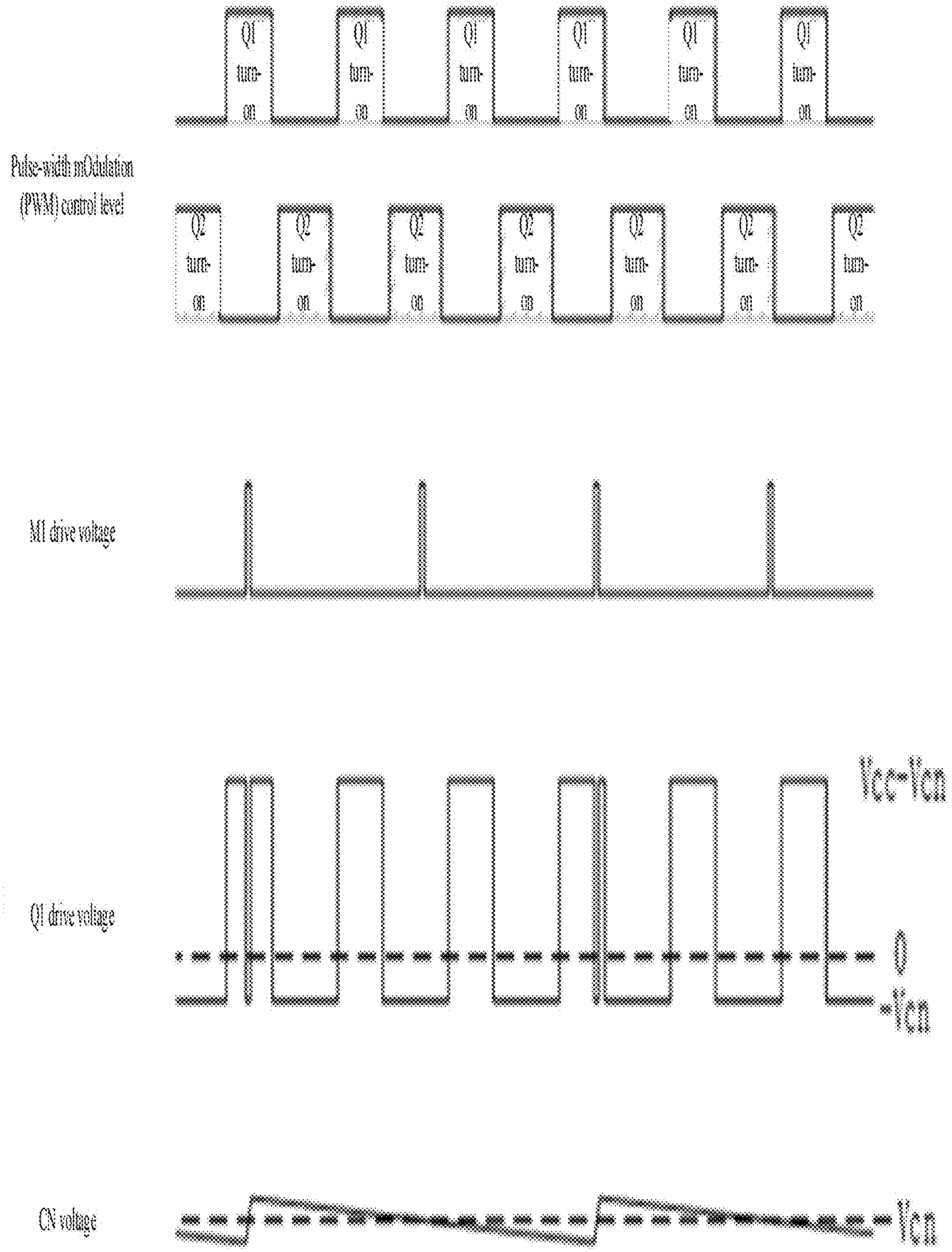
FIG. 7 is a waveform diagram of a bootstrap drive circuit according to a first embodiment of the present disclosure.

Exemplarily, as shown in FIG. 6, when the MOS tube M1 is controlled by the logic control module 152 to be turned on according to the fixed frequency, a timer in an interior of the logic control module 152 outputs a high level signal to a lock register at a fixed time interval, or the system MCU (e.g., when applied to an inverter circuit, it is the system MCU for the inverter circuit) inputs a high level signal to the lock register at regular intervals, and the lock register outputs a high level pulse signal to the MOS drive circuit to drive the MOS tube M1 to be turned on briefly. When the switch tube Q1 is in the turn-on state, the turn-on of the MOS tube M1 enables the negative voltage capacitor CN to be charged; and when the switch tube Q1 is in the turn-off state, the turn-on of the MOS tube M1 has no effect. A waveform when the MOS tube M1 is turned on at the fixed frequency is shown in FIG. 7. Based on the foregoing analysis, it can be seen that this manner may be used for the case where the performance requirements for the circuit like the inverter circuit are low, and no low duty ratio occurs.

Exemplarily, the MOS tube M1 is controlled by the logic control module 152 to be turned on according to the random frequency.

Exemplarily, as shown in FIG. 6, when the MOS tube M1 is controlled by the logic control module 152 to be turned on according to the random frequency, a high level signal may be inputted by the system MCU randomly to the lock register according to the random frequency, and the lock register outputs the high level pulse signal to the MOS drive circuit to drive the MOS tube M1 to be turned on briefly. Based on the foregoing analysis, it can be seen that this manner may be used for the case where the performance requirements for the circuit such as the inverter circuit are low, and no low duty ratio occurs.

As a third example, the logic control module 152 obtains the voltage across the two terminals of the negative voltage capacitor CN and controls, in response to the negative voltage capacitor CN being determined as undervoltage based on the voltage across the two terminals of the negative voltage capacitor CN, the MOS tube M1 to be turned on.

Figure 8:
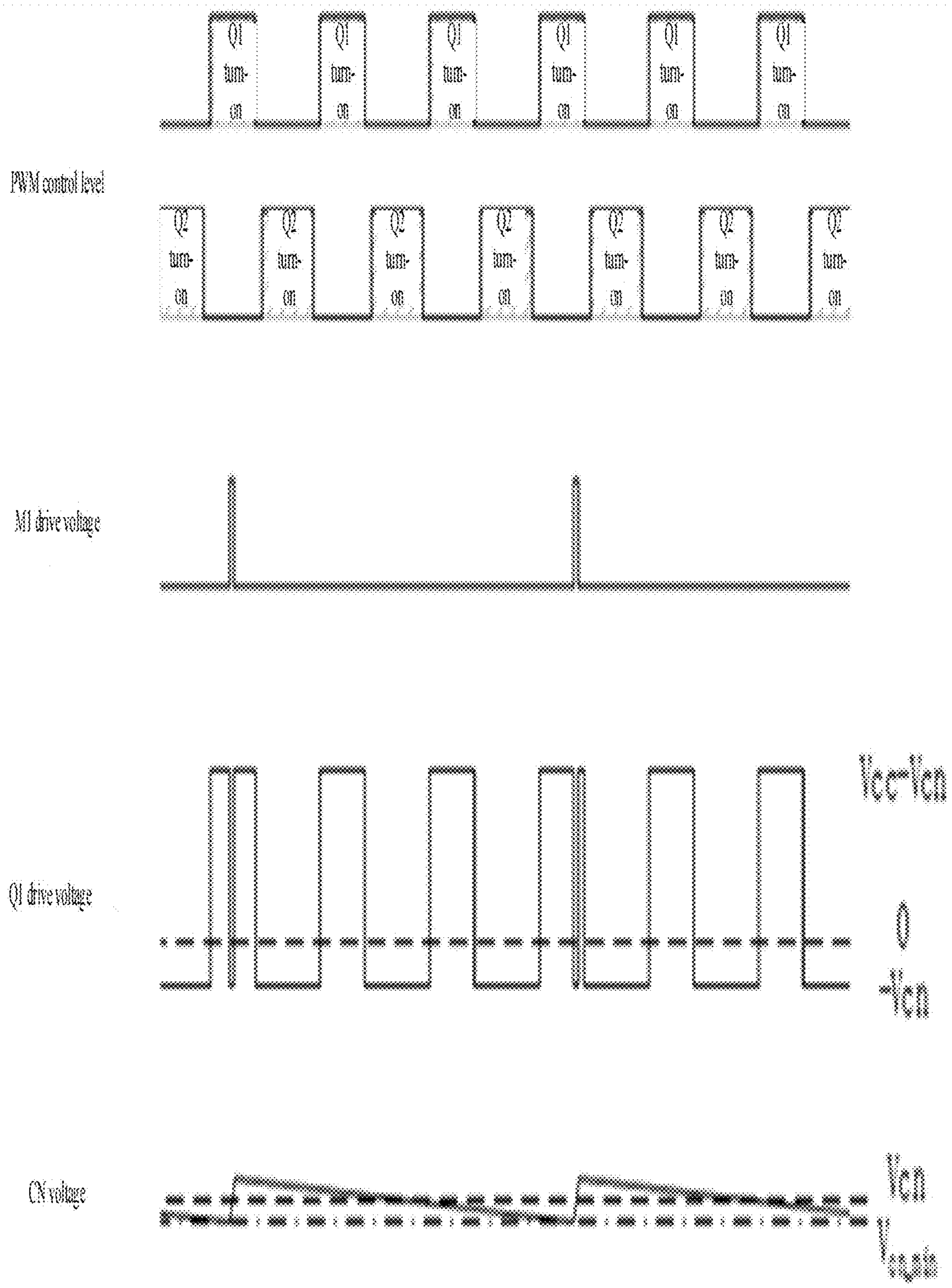
FIG. 8 is a waveform diagram of a bootstrap drive circuit according to a second embodiment of the present disclosure.

Exemplarily, with continued reference to FIG. 6, a comparator in the logic control module 152 stores a minimum Vcn_min allowed by the voltage across the two terminals of the negative voltage capacitor CN and samples the voltage across the two terminals of the negative voltage capacitor CN. When the voltage across the two terminals of the negative voltage capacitor CN is lower than Vcn_min, the comparator transmits a high level signal to the lock register, and the lock register outputs the high level pulse signal to the MOS drive circuit to drive the MOS tube M1 to turn on briefly. When the switch tube Q1 is in the on state, the turn-on of the MOS tube M1 enables the negative voltage capacitor CN to be charged; and when the switch tube Q1 is in the off state, the turn-on of the MOS tube M1 has no effect. Therefore, the MOS tube M1 is turned on only when the negative voltage capacitor CN is undervoltage, and the switch frequency of the MOS tube M1 can be lowered to the lowest. The waveform of turning on the MOS tube M1 when the negative voltage capacitor CN is undervoltage is shown in FIG. 8. Based on the foregoing analysis, it can be seen that this manner may be used for a case where the performance requirements for the circuit such as the inverter circuit are not high.

As a fourth example, the logic control module 152 obtains the voltage across the two terminals of the negative voltage capacitor CN, and controls, in response to the negative voltage capacitor CN being determined as undervoltage according to the voltage across the two terminals of the negative voltage capacitor CN during rising edges of the drive voltage outputted by the drive unit 130, the MOS tube M1 to be turned on.

Figure 9:
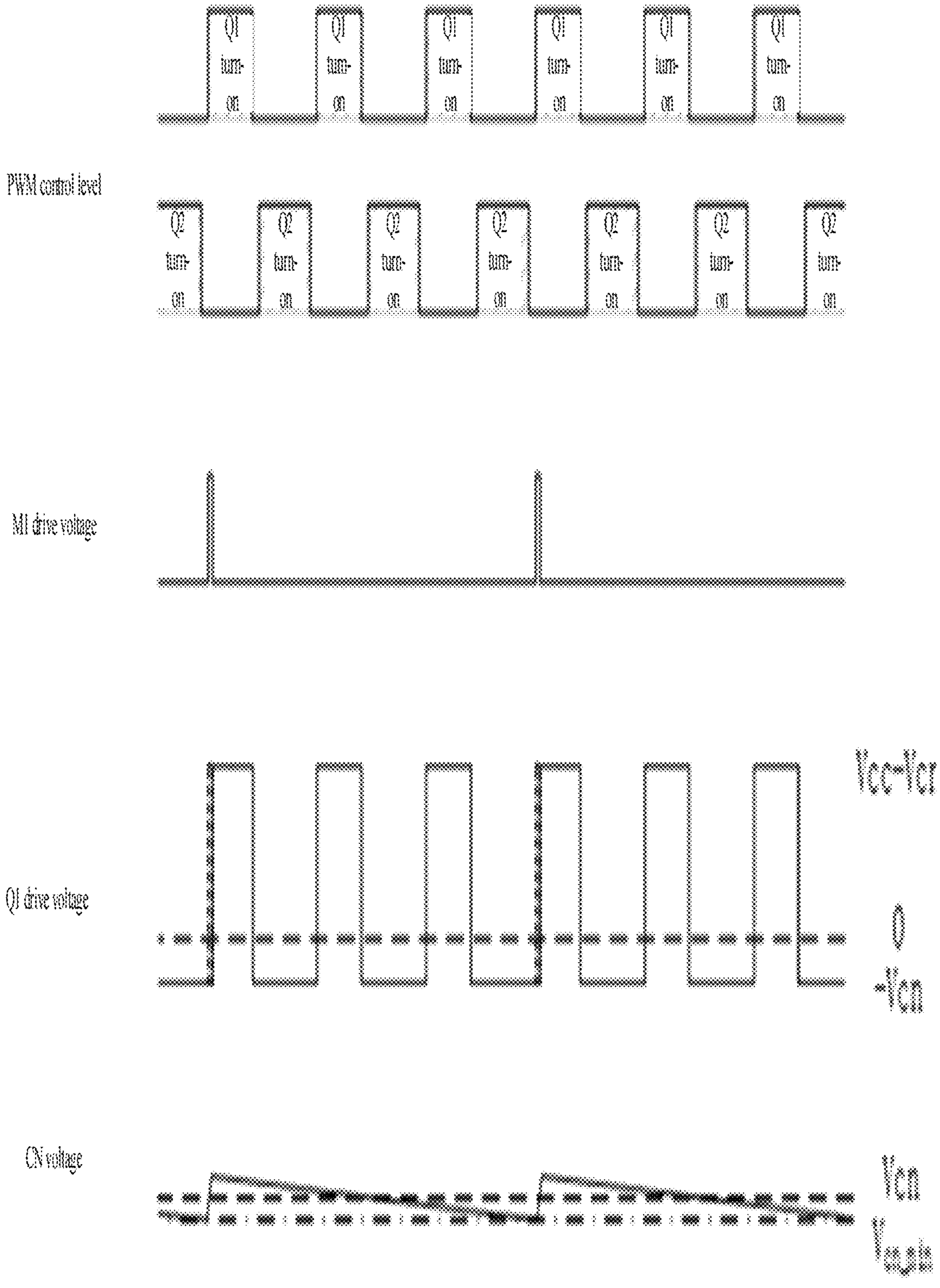
FIG. 9 is a waveform diagram of a bootstrap drive circuit according to a third embodiment of the present disclosure.

Exemplarily, with continued reference to FIG. 6, the comparator in the logic control module 152 samples the voltage across the two terminals of the negative voltage capacitor CN, and outputs the high level signal when the voltage across the two terminals of the negative voltage capacitor CN is lower than Vcn_min; and at the same time, a trigger is connected to the output pin OUT of the drive unit 130 and outputs the high level signal during rising edges of the output signal of the output pin OUT of the drive unit 130. Moreover, the signals outputted by the comparator and the trigger are outputted to the lock register after being subjected to an AND gate operation. That is, when only the comparator and the trigger each output the high level signal, the AND gate can output the high level signal to the lock register to drive the MOS tube M1 to be turned on, i.e., when the voltage across the two terminals of the negative voltage capacitor CN is lower than Vcn_min, during rising edges of the output signal of the output pin OUT of the drive unit 130, the MOS tube M1 is controlled by the logic control module 152 to be turned on to charge the negative voltage capacitor CN. Therefore, the distortion degree of the drive voltage of the switch tube Q1 can be lowered, and the corresponding waveform is shown in FIG. 9. Based on the foregoing analysis, it can be seen that this manner may be applied to the case where the requirement for the circuit such as the inverter circuit is high.

As a fifth example, the MOS tube M1 is controlled by the logic control module 152 to be turned on during the rising edges of the drive voltage outputted by the drive unit 130.

Figure 10:
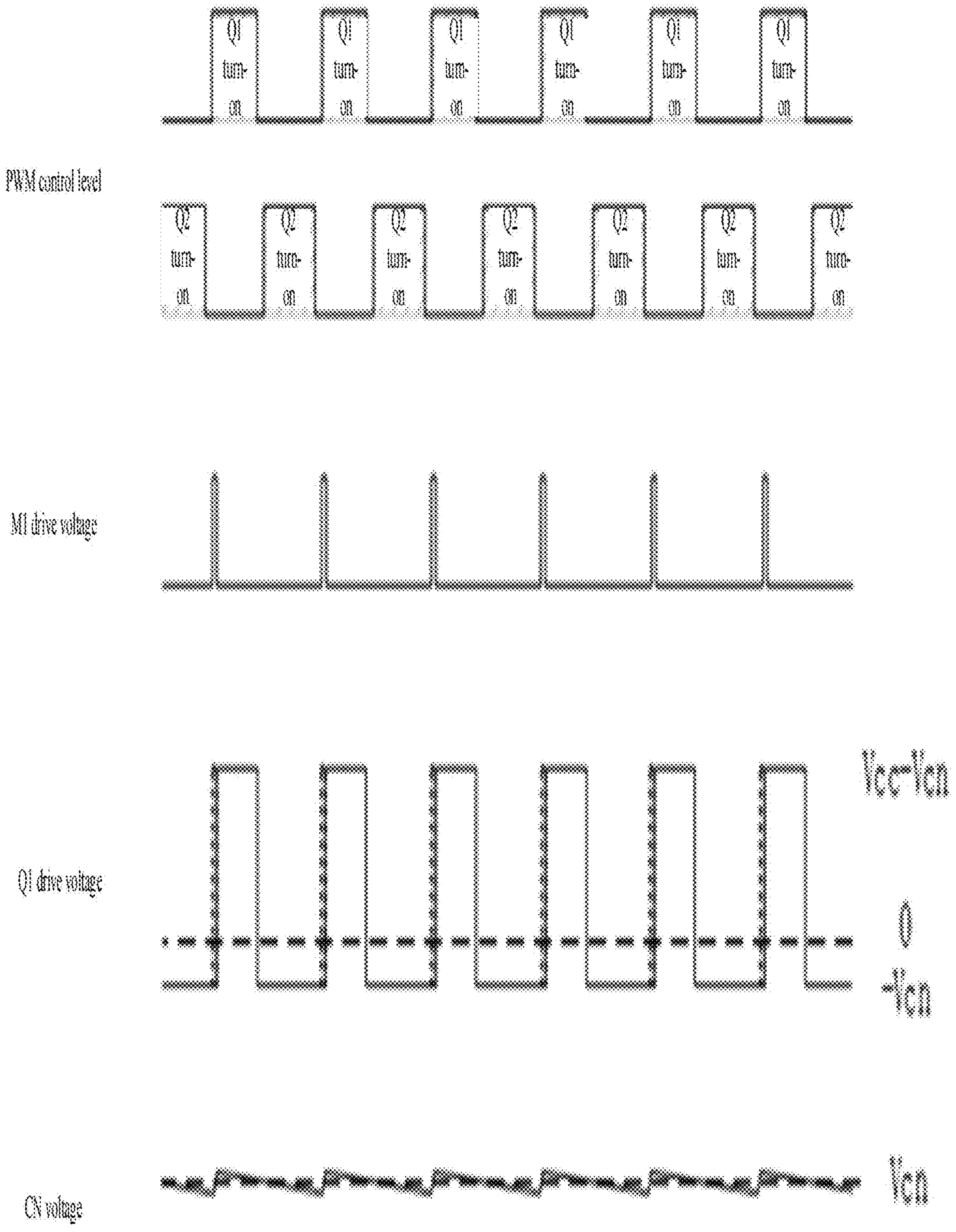
FIG. 10 is a waveform diagram of a bootstrap drive circuit according to a fourth embodiment of the present disclosure.

Exemplarily, with continued reference to FIG. 6, the trigger in the logic control module 152 is connected to the output pin OUT of the drive unit 130 and outputs the high level signal to the lock register during the rising edges of the output signal of the output pin OUT of the drive unit 130, and the lock register outputs the high level pulse signal to drive the MOS tube M1 to be turned on, to charge the negative voltage capacitor CN. Moreover, the corresponding waveform is shown in FIG. 10. Based on the foregoing analysis, it can be seen that this manner may be applied to the case where the requirement for the circuit such as the inverter circuit is high.

In conclusion, with the bootstrap drive circuit according to the embodiments of the present disclosure, a voltage stabilization processing is performed on the bootstrap voltage through the voltage stabilization unit, which can ensure the stability of the bootstrap voltage, and further ensures the stability of the drive voltage and the turn-off negative voltage, thereby improving the drive performance of the circuit. On this basis, the negative voltage unit is charged through the charging control unit to compensate the turn-off negative voltage, so that the stability of the turn-off negative voltage and the drive voltage can be ensured, and the drive performance of the circuit is further improved.

Corresponding to the above embodiments, the present disclosure further provides a motor controller.

Figure 11:
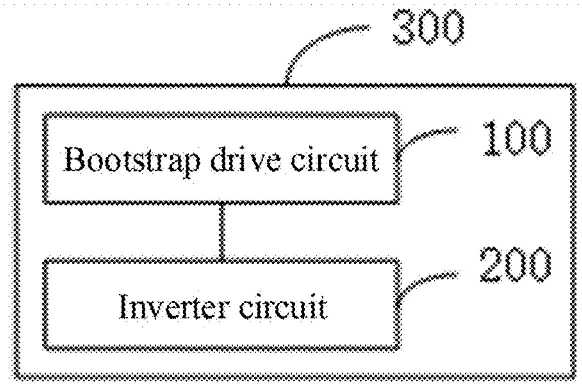
FIG. 11 is a schematic block diagram of a motor controller according to an embodiment of the present disclosure.

FIG. 11 is a schematic block diagram of a motor controller according to an embodiment of the present disclosure.

The motor controller 300 according to the embodiments of the present disclosure may include an inverter circuit 200 and the bootstrap drive circuit 100 as described above. The bootstrap drive circuit 100 is configured to drive a switch tube in the inverter circuit 200 to be turned on or turned off, which may specifically include driving an upper bridge arm switch tube and a lower bridge arm switch tube of each bridge arm in the inverter circuit 200 to be turned on or turned off.

In some embodiments of the present disclosure, the inverter circuit 200 may be a three-phase bridge inverter circuit, a single-phase full-bridge inverter circuit, a single-phase half-bridge inverter circuit, or the like, which is not limited herein. When the inverter circuit 200 is driven by the bootstrap drive circuit 100 to operate, the bootstrap unit in the bootstrap drive circuit 100 provides the voltage stabilization unit with the bootstrap voltage, and a voltage stabilization processing is performed on the bootstrap voltage through the voltage stabilization unit to output the stable drive voltage to the drive unit. The drive unit drives, when receiving the turn-on control signal, the corresponding switch tube to be turned on according to the stable drive voltage, and controls, when receiving the turn-off control signal, the negative voltage unit to generate the stable turn-off negative voltage according to the stable drive voltage, to drive the switch tube to be turned off.

With the motor controller according to the embodiments of the present disclosure, through the bootstrap drive circuit, by performing a voltage stabilization processing on the bootstrap voltage through the voltage stabilization unit, the stability of the bootstrap voltage can be ensured, the stability of the drive voltage and the turn-off negative voltage is further ensured, and the drive performance of the circuit is improved. On this basis, the negative voltage unit is charged through the charging control unit to compensate the turn-off negative voltage, so that the stability of the turn-off negative voltage and the drive voltage can be ensured, and the drive performance of the circuit is further improved.

Corresponding to the above embodiments, the present disclosure further provides a compressor.

Figure 12:
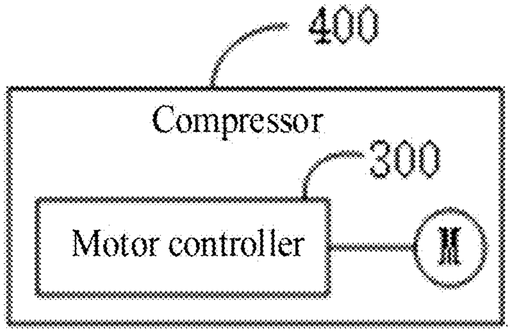
FIG. 12 is a schematic block diagram of a compressor according to an embodiment of the present disclosure.

FIG. 12 is a schematic block diagram of a compressor according to an embodiment of the present disclosure.

The compressor 400 in this embodiment of the present disclosure may include a motor M and the motor controller 300 as described above. The motor controller 300 is configured to drive the motor M to operate.

In some embodiments, the compressor 400 may be an electric compressor including a drive portion and a compression portion. The compression portion is driven by the drive portion in the electric compressor to perform compression operation. For example, the drive portion may include a motor M including a rotor and a stator, and the above motor controller 300. The motor M is driven by the motor controller 300 to operate, to drive the compression portion to perform compression operation. In addition, in some embodiments, the electric compressor may be a low-back compressor, the drive portion may be disposed in a low-voltage cavity in communication with a gas suction opening of the compressor, and the compression portion may be disposed in a high-voltage cavity in communication with a gas exhaust opening of the compressor. In addition, in some embodiments, the electric compressor may be a horizontal compressor, the drive portion and the compression portion may be arranged horizontally, and the like.

In a process where the motor M is driven by the motor controller 300 to operate to drive the compression portion to perform compression operation, the bootstrap unit in the bootstrap drive circuit provides the bootstrap voltage to the voltage stabilization unit, and a voltage stabilization processing is performed on the bootstrap voltage through the voltage stabilization unit to output the stable drive voltage to the drive unit. The drive unit drives, when receiving the turn-on control signal, the corresponding switch tube to be turned on according to the stable drive voltage, and controls, when receiving the turn-off control signal, the negative voltage unit to generate the stable turn-off negative voltage according to the stable drive voltage, to drive the switch tube to be turned off.

With the compressor according to the embodiments of the present disclosure, through the motor controller described above, by performing a voltage stabilization processing on the bootstrap voltage through the voltage stabilization unit, the stability of the bootstrap voltage can be ensured, the stability of the drive voltage and the turn-off negative voltage is further ensured, and the drive performance of the circuit is improved. On this basis, by charging the negative voltage unit through the charging control unit to compensate the turn-off negative voltage, the stability of the turn-off negative voltage and the drive voltage can be ensured, the drive performance of the circuit is further improved, and the performance of the compressor is improved.

Corresponding to the above embodiments, the present disclosure further provides a vehicle.

Figure 13:
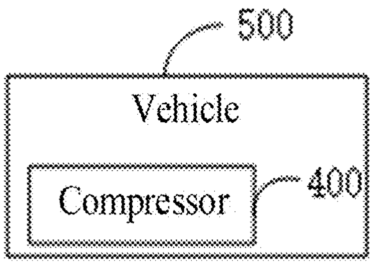
FIG. 13 is a schematic block diagram of a vehicle according to an embodiment of the present disclosure.

FIG. 13 is a schematic block diagram of a vehicle according to an embodiment of the present disclosure.

The vehicle 500 according to the embodiments of the present disclosure includes the compressor 400 described above.

In an embodiment of the present disclosure, the vehicle 500 includes the compressor 400 described in any of the above embodiments, which may be a new energy vehicle. In some embodiments, the new energy vehicle may be a pure electric vehicle using the motor as a main drive force. In some other embodiments, the new energy vehicle may also be a hybrid vehicle that uses an internal combustion engine and a motor as main drive forces concurrently. For the internal combustion engine and the motor for providing drive power for the new energy vehicle mentioned in the above embodiments, the internal combustion engine may use gasoline, diesel, hydrogen, and the like as fuel, and a manner of providing electric energy for the motor may be using a power battery, a hydrogen fuel cell, and the like, which are not specially limited herein. It should be noted that the description herein is merely an exemplary description for structures such as a new energy vehicle, and is not intended to limit the protection scope of the present disclosure.

According to the vehicle, through the compressor described above, by performing a voltage stabilization processing on the bootstrap voltage through the voltage stabilization unit, the stability of the bootstrap voltage can be ensured, the stability of the drive voltage and the turn-off negative voltage is further ensured, and the drive performance of the circuit is improved. On this basis, by charging the negative voltage unit through the charging control unit to compensate the turn-off negative voltage, the stability of the turn-off negative voltage and the drive voltage can be ensured, the drive performance of the circuit is further improved, the performance of the compressor is improved, and the performance of the vehicle is further improved.

It should be noted that the logic and/or step described in other manners herein or shown in the flowchart, for example, a particular sequence table of executable instructions for realizing the logical function, may be specifically realized in any computer readable medium to be used by the instruction execution system, apparatus or device (such as the system based on computers, the system including processors or other systems capable of obtaining the instructions from the instruction execution system, apparatus and device and executing the instructions), or to be used in combination with the instruction execution system, apparatus and device. As to the specification, "the computer readable medium" may be any device adaptive for including, storing, communicating, propagating or transferring programs to be used by or in combination with the instruction execution system, apparatus or device. More specific examples of the computer readable medium include but are not limited to: an electronic connection (an electronic device) with one or a plurality of wires, a portable computer disk case (a magnetic device), a random access memory (RAM), a read only memory (ROM), an erasable programmable read-only memory (EPROM or a flash memory), an optical fiber device, and a portable compact disk read-only memory (CDROM). In addition, the computer readable medium may even be a paper or other appropriate medium capable of being printed with programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware, or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "a plurality of" means at least two, such as two, three, etc., unless otherwise specifically defined.

In the present disclosure, unless otherwise clearly specified and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the present disclosure can be understood according to specific circumstances.

Although the embodiments of the present disclosure have been shown and described above, it can be understood that the above-mentioned embodiments are exemplary and should not be construed as limiting the present disclosure. Those of ordinary skill in the art can make changes, modifications, substitutions and modifications to the above-mentioned embodiments within the scope of the present disclosure.

The invention claimed is:

1. A bootstrap drive circuit comprising a bootstrap unit, a negative voltage unit, a drive unit, and a voltage stabilization unit, wherein:

the bootstrap unit is configured to provide the voltage stabilization unit with a bootstrap voltage;

the voltage stabilization unit is configured to perform a voltage stabilization processing on the bootstrap voltage to output a stable drive voltage to the drive unit;

the drive unit is configured to:

drive, in response to receiving a turn-on control signal and based on the stable drive voltage, a switch tube corresponding to the drive unit to be turned on; and control, in response to receiving a turn-off control signal and based on the stable drive voltage, the negative voltage unit to drive the switch tube to be turned off by generating a stable turn-off negative voltage;

an input terminal of the voltage stabilization unit is connected to an output terminal of the bootstrap unit;

a reference ground terminal of the voltage stabilization unit is connected to a negative electrode terminal of the bootstrap unit and a power-supply negative-electrode pin of the drive unit;

an output terminal of the voltage stabilization unit is connected to a power-supply positive-electrode pin of the drive unit;

an output pin of the drive unit is connected to a positive terminal of the negative voltage unit; and a negative terminal of the negative voltage unit is connected to a control terminal of the switch tube.

2. The bootstrap drive circuit according to claim 1, wherein the voltage stabilization unit comprises a linear voltage stabilization source.

3. The bootstrap drive circuit according to claim 1, wherein the voltage stabilization unit comprises a switch power supply.

4. The bootstrap drive circuit according to claim 1, wherein the switch tube comprises an upper bridge switch tube of an inverter circuit.

5. The bootstrap drive circuit according to claim 1, further comprising:

a charging control unit configured to control, when the switch tube is turned on, the negative voltage unit to charge, to perform a secondary voltage stabilization processing on the turn-off negative voltage generated by the negative voltage unit.

6. The bootstrap drive circuit according to claim 5, wherein the charging control unit comprises:

a controllable switch module connected between a negative terminal of the negative voltage unit and a negative electrode terminal of the bootstrap unit; and a logic control module configured to control the controllable switch module to be turned on, to charge the negative voltage unit through the drive voltage.

7. The bootstrap drive circuit according to claim 6, wherein the logic control module is further configured to:

obtain a voltage across two terminals of the negative voltage unit; and control, in response to the negative voltage unit being determined as undervoltage based on the voltage across the two terminals of the negative voltage unit during rising edges of the drive voltage outputted by the drive unit, the controllable switch module to be turned on.

8. The bootstrap drive circuit according to claim 6, wherein the logic control module is further configured to, during rising edges of the drive voltage outputted by the drive unit, control the controllable switch module to be turned on.

9. The bootstrap drive circuit according to claim 6, wherein:

the controllable switch module comprises a metal oxide semiconductor (MOS) tube and a current-limiting resistor; and the current-limiting resistor is connected between a drain electrode of the MOS tube and the negative terminal of the negative voltage unit.

10. The bootstrap drive circuit according to claim 9, wherein:

in response to the MOS tube having a body diode, the controllable switch module further comprises a first diode having an anode connected to the source electrode of the MOS tube and a cathode connected to the negative electrode terminal of the bootstrap unit.

11. The bootstrap drive circuit according to claim 6, wherein:

the controllable switch module comprises a metal oxide semiconductor (MOS) tube and a current-limiting resistor; and the current-limiting resistor is connected between a source electrode of the MOS tube and the negative electrode terminal of the bootstrap unit.

12. The bootstrap drive circuit according to claim 11, wherein:

in response to the MOS tube having a body diode, the controllable switch module further comprises a first diode having an anode connected to the source electrode of the MOS tube and a cathode connected to the negative electrode terminal of the bootstrap unit.

13. The bootstrap drive circuit according to claim 1, wherein the bootstrap unit comprises: a power supply having a negative electrode terminal that is grounded; a bootstrap diode having an anode connected to a positive electrode terminal of the power supply; a bootstrap resistor having one terminal connected to a cathode of the bootstrap diode; and a bootstrap capacitor, a positive electrode terminal of the bootstrap capacitor being connected to another terminal of the bootstrap resistor and having a first node, and a negative electrode terminal of the bootstrap capacitor being connected to the reference ground terminal of the voltage stabilization unit, wherein the first node is used as the output terminal of the bootstrap unit.

14. The bootstrap drive circuit according to claim 13, wherein the negative voltage unit comprises:

a negative voltage capacitor having a positive electrode terminal connected to the output pin of the drive unit and a negative electrode terminal used as a negative terminal of the negative voltage unit; and a first voltage stabilization tube having an anode connected to the negative electrode terminal of the negative voltage capacitor and a cathode connected to the positive electrode terminal of the negative voltage capacitor.

15. A motor controller comprising:

an inverter circuit; and the bootstrap drive circuit according to claim 1, the bootstrap drive circuit being configured to drive a switch tube in the inverter circuit to be turned on or turned off.

16. The motor controller according to claim 15, wherein the inverter circuit is a three-phase bridge inverter circuit, a single-phase full-bridge inverter circuit, or a single-phase half-bridge inverter circuit.

17. A compressor comprising:

a motor;

the motor controller according to claim 16, the motor controller being configured to drive the motor to operate.

18. A vehicle comprising the compressor according to claim 17.

* * * * *